US005692109A

United States Patent [19]

Shu

[11] Patent Number: 5,692,109
[45] Date of Patent: Nov. 25, 1997

[54] METHOD AND APPARATUS FOR MINIMIZING ARTIFACTS IN IMAGES PRODUCED BY ERROR DIFFUSION HALFTONING

[75] Inventor: Joseph S. Shu, San Jose, Calif.

[73] Assignee: Seiko Epson Corporation, Tokyo, Japan

[21] Appl. No.: 269,708

[22] Filed: Jul. 1, 1994

[51] Int. Cl.⁶ .......................... G06K 15/00; H04N 1/40
[52] U.S. Cl. ........................ 395/109; 358/447; 358/448; 358/455; 358/474
[58] Field of Search ..................... 395/109, 105, 395/107, 117; 358/445, 447, 456, 448, 494, 497, 486, 455, 458, 474

[56] References Cited

U.S. PATENT DOCUMENTS

| | | | |
|---|---|---|---|
| 4,533,928 | 8/1985 | Sugiura et al. | 347/3 |
| 4,654,721 | 3/1987 | Goertzel et al. | 358/459 |
| 4,953,013 | 8/1990 | Tsuji et al. | 358/453 |
| 4,955,065 | 9/1990 | Ulichney | 358/456 |
| 5,107,346 | 4/1992 | Bowers et al. | 358/447 |
| 5,140,432 | 8/1992 | Chan | 358/455 |
| 5,243,444 | 9/1993 | Fan | 358/455 |
| 5,258,854 | 11/1993 | Eschbach | 358/455 |
| 5,260,810 | 11/1993 | Kanno et al. | 358/455 |
| 5,268,774 | 12/1993 | Eschbach | 358/466 |
| 5,291,309 | 3/1994 | Semasa | 358/455 |
| 5,307,426 | 4/1994 | Kanno | 358/456 |
| 5,313,287 | 5/1994 | Barton | 358/458 |
| 5,313,533 | 5/1994 | Scott | 358/466 |
| 5,337,160 | 8/1994 | Jones | 358/447 |
| 5,343,309 | 8/1994 | Roetling | 358/455 |
| 5,363,213 | 11/1994 | Coward et al. | 358/455 |
| 5,418,626 | 5/1995 | Semasa | 358/451 |

FOREIGN PATENT DOCUMENTS

| | | |
|---|---|---|
| 3151762 | 6/1991 | Japan . |
| 437256 | 2/1992 | Japan . |
| 451773 | 2/1992 | Japan . |

Primary Examiner—Dwayne Bost
Assistant Examiner—Tracy M. Legree
Attorney, Agent, or Firm—Eric B. Janofsky

[57] ABSTRACT

An image preprocessing method and apparatus processes image data line-by-line using an error diffusion process to generate a halftoned image. The method and apparatus varies the processing direction from line-to-line to minimize the presence of worm-type artifacts in a halftoned image where the processing direction of each line in the image is dependent on the content of the image. More particularly, the processing direction of each line in the image is dependent upon the grayscale value and/or the quantization error associated with one or more pixels of a previously processed line in the image.

40 Claims, 4 Drawing Sheets

METHOD AND APPARATUS FOR MINIMIZING ARTIFACTS IN IMAGES PRODUCED BY ERROR DIFFUSION HALFTONING

CROSS REFERENCE TO RELATED APPLICATIONS

The following applications, filed on an even date herewith and assigned to the assignee of the instant application contain related subject matter to the instant application: IMPROVED METHOD AND APPARATUS FOR TONAL CORRECTION IN BINARY PRINTING DEVICES BY PREDISTORTION OF IMAGE DATA filed as Ser. No. 08/269,601 by Joseph S. Shu and IMPROVED METHOD AND APPARATUS FOR DITHER ARRAY GENERATION TO REDUCE ARTIFACTS IN HALFTONED IMAGES filed as Ser. No. 08/269,709 by Joseph S. Shu.

BACKGROUND OF THE INVENTION

1. Field of the Invention

The present invention relates to digital printing devices, and in particular, to a technique for minimizing artifacts ("worms") in the printed output of such devices, which artifacts are caused by error diffusion halftoning.

2. Description of the Related Art

Most computer-driven printing devices which generate hard copy, such as laser, dot-matrix and ink-jet printers, print in a binary fashion—the output medium is divided into an array of picture elements or "pixels" and the devices can either print a small colored dot at each pixel location or leave the pixel location blank. In the case of monochrome printers, all of the dots are printed with a single color whereas with color printers a dot color is chosen from a small set of colors. In any ease, the dot itself has a uniform color so that the resulting output consists of an array of colored and blank pixels.

Pictorial images such as those produced by photographic techniques or by computerized imaging systems, by contrast, are continuous in tonality. If such an image is divided into pixels, each pixel exhibits a "grayscale" color whose tonal value falls within a range of tonal values. In order to reproduce such "continuous-tone" images by means of electronic printing, the images must therefore be converted into a form which is suited to the characteristics of the printing device, generally a binary format. This conversion process, which may take many forms, is generically referred to as "halftoning." Although a halftone image actually consists solely of a spatial pattern of binary pixels (colored or blank dots), the human visual system integrates this pattern to create an illusion of a continuous-tone image.

During the printing process, the image to be printed is divided into a series of pixels and the value of the image in each pixel is quantized to produce a multi-bit digital word which represents the tonal value of the pixel. The image is thus converted to a stream of digital words which are provided to the printing device. In order to convert the format of each word into a format suitable for reproduction on the digital device, halftoning is performed on the digital word stream during a process called "preprocessing". Numerous halftoning techniques have been developed and refined over the years. In their simplest form, such techniques compare the value of each digital word with a threshold level, and generate a binary output pixel value depending on the relative values.

For example, a digital scanner processing a continuous-tone image might generate a stream of multi-bit words representing the detected light intensities. Commonly, the numerical value of these words ranges from 0 to 255, corresponding to a 256-level gray scale or an eight-bit word. If such a digital word stream is to be reproduced on a binary printing device, the halftoning process compares the scanner output words with a either a single threshold value or an array of threshold values to produce the required binary output pixel stream. In such a system, each 8-bit scanner word has effectively been compressed into a single-bit output word.

Naturally, such compression produces a significant loss of visual information and, in turn, creates distortions in the reproduced image that are not present in the original image. Additional techniques have therefore been developed to reduce the visual distortions created by the halftoning process. One approach, known as "error diffusion", attempts to "diffuse" the "quantization error" (i.e., the difference between the input value represented by a multi-bit word and the output value represented by a single bit or two multi-bit words) proportionally among neighboring pixels. This diffusion is performed by adding a portion of the quantization error to the input values of the next pixel in the processing line and to neighboring pixels in the following line or lines. The quantization error is added to the pixel values before processing so that the quantization error is "spread" over several pixels.

In accordance with one embodiment of the error diffusion process, the input pixels represented by the input words are processed in "raster" order (line-by-line with each line being processed from left to right before the next lower line is processed). In general with a left-to-right processing order, the error diffusion process produces an excellent image reproduction, but also creates well-known artifacts called "worms" and "snowplowing" which degrade image quality. The "worms" appear as curved or straight diagonal lines in areas of uniform gray and produce a patterned appearance in the halftoned image. Consequently, various techniques have been used to reduce or eliminate these kinds of artifact patterns.

Some of these known techniques, described, for example, in U.S. Pat. No. 4,955,065, Japanese Laid-Open Patent HEI 4-37256/92 and Japanese Laid-Open Patent HEI 4-51773/92, vary the processing sequence from the conventional raster scan pattern (where each the pixels in each line of the image are processed left-to-right and the lines are processed in a top-to-bottom order) to a serpentine scan pattern where the pixel lines are still processed from top-to-bottom, but alternate pixel lines are processed in opposite directions. This technique re-orients the worms so that they appear as horizontal lines in uniform gray areas of the image and are thus less obtrusive; however they are still present to the same degree as when the conventional raster scan is used.

Another known method, described in Japanese Laid-Open Patent HEI 3-151762/91, of minimizing the appearance of worms also varies the processing sequence from the conventional raster pattern. In accordance with one embodiment, the processing direction for each image line is selected based on the output of a random number generator or noise pattern generator which is quantized to yield a stream of "1's" and "0's". Pixel processing for each line is therefore performed left-to-right (in response to a "1") or right-to-left (in response to a "0") in a random pattern. In accordance with another known embodiment, pixels in image lines are processed left-to-right and right-to-left in predetermined periodic patterns, e.g., two left-to-right scans, followed by two right-to-left scans, and so on. While these prior processing order techniques reduce the size of the worms, the worms are still visible in the halftoned image.

Accordingly, it is an object of the present invention to provide apparatus and a method of improving the quality of the halftone images produced by a binary printing device.

Another object of the invention is to provide a method and apparatus which minimizes image artifacts due to error diffusion halftoning in the output images produced by a binary printing device, such as an ink jet printer or a laser printer.

Still another object of the invention is to provide such a method which can be implemented relatively easily either in specialized hardware or in existing printer drivers. Other objects will, in part, be obvious and will, in part, appear hereinafter.

DESCRIPTION OF THE INVENTION

Summary of the Invention

Briefly, the present preprocessing method and apparatus varies the processing direction from line-to-line to minimize the presence of worm-type artifacts in a halftoned image. However, unlike the prior art processing techniques where the processing direction is independent of the image content, an adaptive processing direction technique is utilized wherein the processing direction of each line in the image is dependent on the content of the image. More particularly, the processing direction of each line in the image is dependent upon the grayscale value and/or the quantization error associated with one or more pixels of a previously processed line in the image.

In particular, during the aforementioned error diffusion processing, grayscale values for a line of pixels are stored in an image line buffer. In addition, error values which are generated from a line of pixels and are to be "diffused" to the next line of pixels are also stored in an error line buffer. In accordance with the principles of the invention, selected pixel values retrieved from the image line buffer, the error line buffer or both buffers are combined logically or arithmetically, and a modulo-2 operation is performed on the result of the combination to generate a binary "1" or "0" value. The binary value is then used to determine the processing direction of the next image line so that the processing direction of the pixels in the next image line is dependent on the image content of the previous line (or lines depending on the error diffusion algorithm).

The inventive method can be incorporated easily into the driver software of a printing device at relatively little cost or embodied in specialized hardware in the printer port or the printer itself. When the inventive method is utilized high-quality halftone images can be produced by means of error diffusion halftoning with minimized worm-type artifacts.

BRIEF DESCRIPTION OF THE DRAWING

For a better understanding of the nature and objects of the invention, reference should be had to the following detailed description, taken in connection with the accompanying drawing, in which.

DETAILED DESCRIPTION OF AN ILLUSTRATIVE EMBODIMENT

Figure 1:
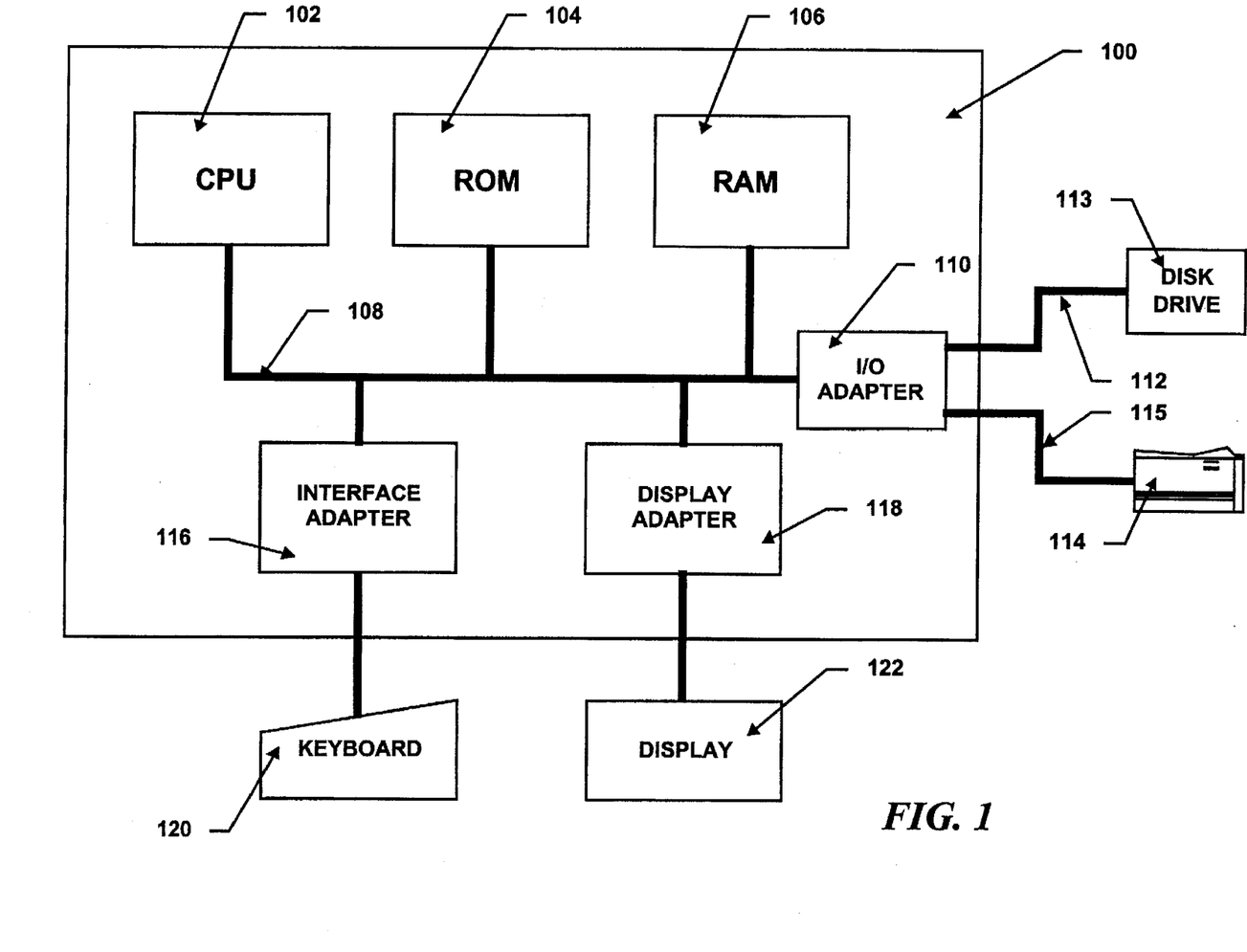
FIG. 1 is a block schematic diagram of a computer system, for example, a personal computer system on which a halftoning operation using an error diffusion technique as modified by the inventive method can operate.

The invention is preferably practiced in the context of an operating system resident on a personal computer such as the IBM PS/2 or Apple Macintosh computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122 such as a video monitor. The workstation has resident thereon, and is controlled and coordinated by, an operating system.

A computer system such as that shown in FIG. 1 generally includes a printing device which is electrically connected to the computer system and controlled by it in order to generate a permanent image on a selected medium. In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include a preprocessing step in which a graphical display is converted into the form used by the printing device by the halftoning operations discussed above.

The pagination and reformatting necessary to convert the printable information into a form which can be printed a given printing device can be performed by specialized hardware, but are generally performed by software programs running within the computer system. The pagination is performed by either an application program which generated the initial output or by an operating system which is a collection of utility programs that perform basic file manipulation functions. The reformatting, including the halftoning operations, are specific to the printing device and are usually contained in a software program called a "driver" which may be part of the operating system, but must be specifically associated with a particular printing device. The driver program receives textual and image information from the computer system and performs the processing as described above to generate signals that can directly control the printing device.

Figure 2:
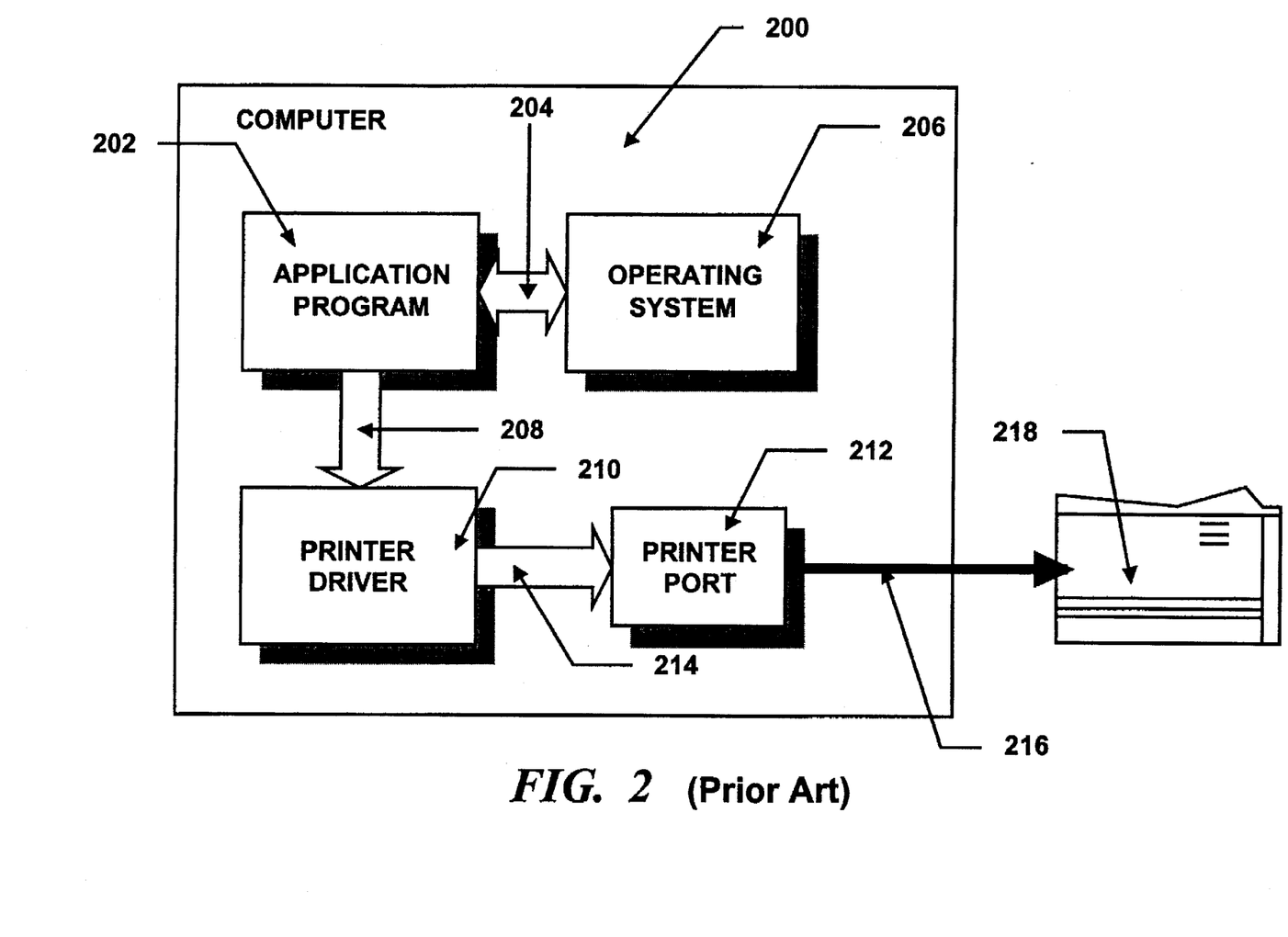
FIG. 2 is a schematic block diagram of a prior art computer system showing the relationship of an application program, an operating system and a printer driver in which the halftoning or preprocessing operation is performed.

For example, FIG. 2 is a schematic illustration of a typical computer system utilizing an application program, an operating system and a printer driver. The computer system is schematically represented by dotted box 200, the application program is represented by box 202 and the operating system by box 206. The interaction between the application program 202 and the operating system 206 is illustrated schematically by arrow 204. This dual program system is used on many types of computers systems ranging from mainframes to personal computers.

The method for handling printing, however, varies from computer to computer, and, in this regard, FIG. 2 represents a typical prior art personal computer system. In order to provide printing functions, the application program 202 interacts (as shown schematically by arrow 208) with printer driver software 210. The printer driver software 210 generally performs halftoning operations and may perform other operations to produce a reformatted information stream containing embedded commands and converted graphical information as shown schematically as arrow 214. The converted information stream is, in turn, applied to a printer port 212 which contains circuitry that converts the incoming information stream into electrical signals. The signals are, in turn, sent over a cable 216 to the printer 218. Printer 218 usually contains a "imaging engine" which is a hardware device or a ROM-programmed computer which takes the incoming information stream and converts it into the electrical signals necessary to drive the actual printing elements. The result is a "hard copy" output on the selected medium. The present invention and the apparatus which performs the error diffusion process may also be incorporated into specialized hardware located in the printer port 212 of the printer 218 itself.

Figure 3:
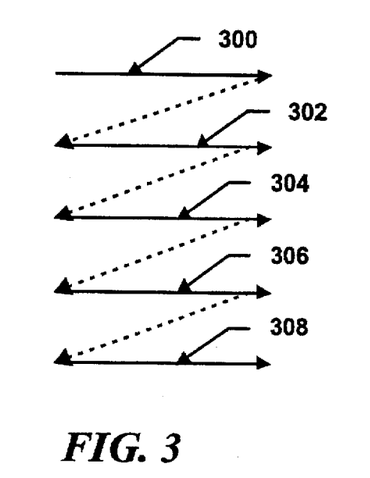
FIG. 3 illustrates a processing sequence for processing pixels in the Prototype Binary Pattern using the error diffusion technique.

The error diffusion process itself is well-known and is, for example, described in detail in "Digital Halftoning" by Robert Ulichney, printed by the MIT Press, Cambridge, Mass. and London, England, 1990, at pps. 239–319. During the error diffusion process, the pixels which comprise the original image are processed on a line-by-line fashion and, in each line, the pixels are processed in single direction (from left-to-right or right-to-left). A common line processing pattern is shown in FIG. 3 where each of the pixel lines 300, 302, 304, 306 and 308 is processed from left-to-right, then the next line is processed from left-to-right, and the following line is processed from left to right, etc. until the entire image is processed in the top to bottom direction.

Figure 4A:
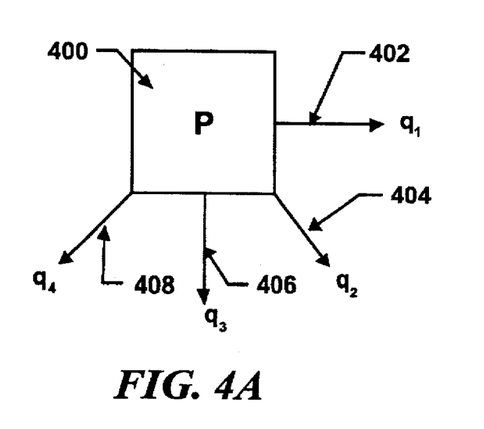
FIG. 4A illustrates an illustrative selection of proportional coefficients used in the error diffusion processing when pixels are processed in the left-to-right direction.

FIG. 4A illustrates diffusion of the error generated during the processing of each pixel to neighboring pixels in the case where processing proceeds along the line in the left-to-right direction. In particular, each pixel is processed by comparing its value to a predetermined threshold value where the pixel "value" is the original grayscale value plus error adjustments resulting from the previous processing of other pixels. If the value of the pixel exceeds the threshold value, then a "1" or dot is output. Alternatively, if the value of the pixel is less than the threshold value, then a "0" or no dot is output. An error value is then determined by subtracting the value of the dot which is actually output from the input value. This error is then "diffused" or spread among neighboring, but unprocessed, pixels.

This "diffusion" process is illustrated in FIG. 4A where the pixel being processed is depicted as box 400. In the illustrated arrangement, the error resulting from the processing is spread to the neighboring pixel to the immediate right of the processed pixel 400 (as indicated by arrow 402) and to three neighboring pixels on the next line of binary pattern pixels as indicated by arrows 404, 406 and 408. Before being added to the neighboring pixels, the error value is multiplied by a proportionality constant. The values of these constants, $q_1$ $q_2$ $q_3$ and $q_4$ are arranged such that $q_1+q_2+q_3+q_4=1$. For example, the following weights can be used: $q_1=5/16$, $q_2=1/16$, $q_3=7/16$ and $q_4=3/16$. After pixel 400 has been processed, the neighboring pixel to the right of pixel 400 is processed by adding the proportionalized error value to the pixel value and processing it in the same manner as pixel 400. After each pixel in a line has been processed in this manner, the next line in the image is processed in the same manner.

Figure 4B:
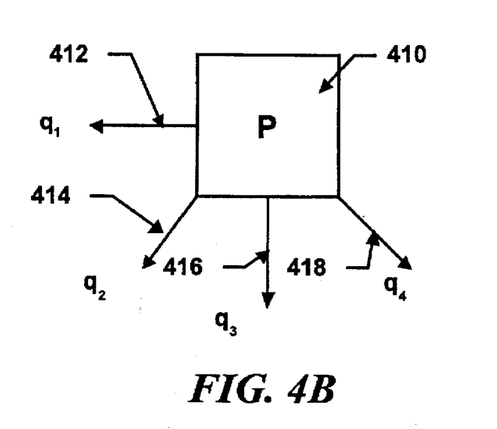
FIG. 4B illustrates an illustrative selection of proportional coefficients used in the error diffusion processing when pixels are processed in the right-to-left direction.

The diffusion process in the case where the pixel processing takes place in the right-to-left direction is illustrated in FIG. 4B where the pixel being processed is depicted as box 410. In the illustrated arrangement, the error resulting from the processing is spread to the neighboring pixel to the immediate left of the processed pixel 410 (as indicated by arrow 412) and to three neighboring pixels on the next line of binary pattern pixels as indicated by arrows 414, 416 and 418. Before being added to the neighboring pixels, the error value is also multiplied by a proportionality constant. The values of these constants, $q_1$ $q_2$ $q_3$ and $q_4$ are arranged such that $q_1+q_2+q_3+q_4=1$. For example, the following weights can be used: $q_1=5/16$, $q_2=1/16$, $q_3=7/16$ and $q_4=3/16$. After pixel 410 has been processed, the neighboring pixel to the left of pixel 410 is processed by adding the proportionalized error value to the pixel value and processing it in the same manner as pixel 410. After each pixel in a line has been processed in this manner, the next line in the image is processed in the same manner.

Figure 5:
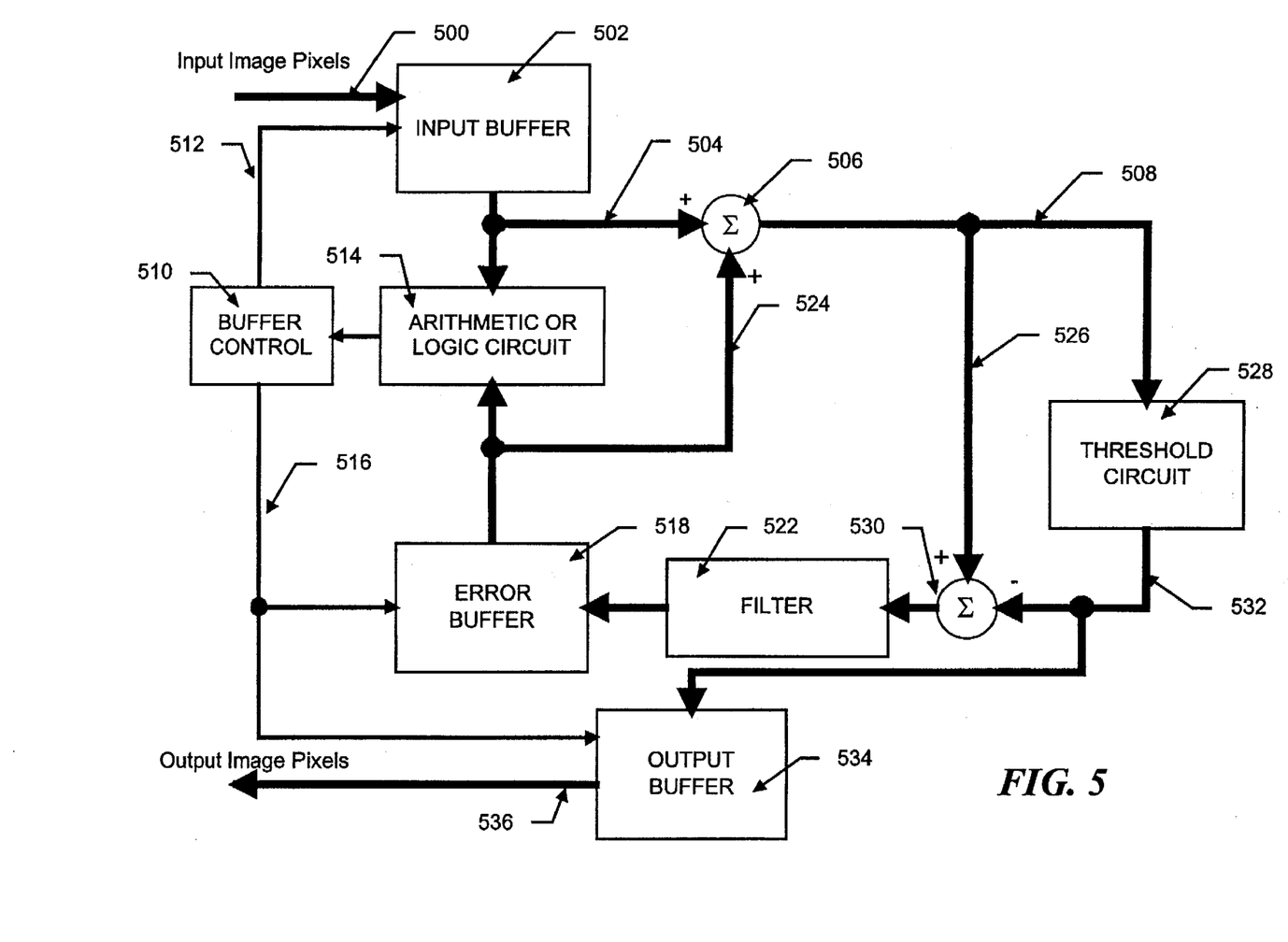
FIG. 5 is a block schematic diagram of an error diffusion halftoning apparatus showing the generation of the processing direction from the line and error buffer contents.

Refer now to FIG. 5 which is an illustrative schematic block diagram that shows an error diffusion circuit modified in accordance with the principles of the invention. The error diffusion circuit receives a stream 500 of grayscale image pixels represented by digital words from an imaging device (not shown) in a conventional manner. The stream of image pixels are entered serially into a conventional input buffer 502. Buffer 502 is, in general, of sufficient size to store incoming image pixel words for an entire line of pixels.

Buffer 502 is, in turn, controlled by buffer control circuit 510 (as indicated schematically by arrow 512) to output the stored values, in line order, to both the summing circuit 506 and to the arithmetic or logic circuit 514. The summing circuit 506 is used to subtract the "error" values produced by the processing of previous pixels as will be described further below. The arithmetic or logic circuit 514 is used, in accordance with the inventive principles, to control the processing direction, also as will be described in detail below. In particular, under control of the buffer control circuit 510 (this control is schematically illustrated as arrow 512), buffer 502 can serially output the stored pixel data either in a "left-to-right" order (last-in, first-out) or can output the stored pixel data in a "right-to-left" order (first-in, first-out).

The stored input data produced at the output 504 of input buffer is applied to the threshold circuit 528 by way of summing circuit 506 and line 508. The output of threshold circuit 528 is a quantized binary image (comprised of "0's" and "1's") which is produced by comparing the pixel values (each pixel "value" comprises the original input image value and "error" adjustments introduced by summing circuit 506) to a predetermined, fixed threshold value and outputting a "1" if the pixel value is greater than the threshold and outputting a "0" if the pixel value is less than or equal to the threshold value. Illustratively, the threshold circuit 528 may use a fixed threshold value such as 0.5 (for a grayscale value range between 0 and 1).

The quantized binary signal generated by the threshold circuit 528 is applied, via output line 532, to a second summing circuit 530 which subtracts the unquantized input signal on line 508 from the quantized output from threshold circuit 528 on line 532 to generate a quantization error value. The quantization error value is applied to filter circuit 522. The filter circuit 522 multiplies the error value by proportionality coefficients to generate the diffused error values, one of which will be added to the next pixel to be processed by summing circuit 506 and the rest of which are stored in error buffer 518 to be added to pixels during processing of the next line of pixels.

Error buffer 518 is also controlled by buffer control circuit 510 (as indicated schematically by arrow 516) to output selected stored values to both summing circuit 506 and to the arithmetic or logic circuit 514 (via output line 524). Under control of the buffer control circuit 510, error buffer 518 can serially output the stored pixel data either in a "left-to-right" order (last-in, first-out) or can output the stored pixel data in a "right-to-left" order (first-in, first-out) in order to match the error data with the input data being shifted out of input buffer 502.

During processing of a line of pixels, buffer control circuit 510 controls both input buffer 502 and error buffer 518 to sequentially provide an input pixel value from buffer 502 to summing circuit 506 and an error value from error buffer 518 to summing circuit 506. Summing circuit then provides sequentially error-diffused values to threshold circuit 528 which generates the quantized output. The output of the threshold circuit 528 is also provided to the output buffer 534 which is also controlled by buffer control circuit 510. Output buffer 534 can output a serial stream of binary pixels for provision to the printing device on line 536.

In accordance with the principles of the invention, the information in either or both of input and error buffers 502 and 518 is used to control the direction of pixel processing so that the processing direction is image dependent. More particularly, in accordance with one embodiment of the invention, selected image pixel values from input buffer 502 are applied over line 504 to an arithmetic or logic circuit 514. The pixel values are then combined using arithmetic operations, logic operations or both to generate a combination output. The combination output is taken modulo-2 to produce a binary output ("1" or "0"). The exact combination of arithmetic or logical operations is not important for the operation of the inventive principles.

The binary output signal generated by circuit 514 is thereupon applied to buffer control circuit 510 which determines the processing order of the pixels in the input buffer 502 and the error buffer 518. That is, if the output of circuit 514 is a "1", the input pixels may be processed from left-to-right; if the output is a "0", a right-to-left process direction is controlled by buffer control circuit.

Other image-dependent information may be used to control the scan direction. For example, the quantization error values stored in error buffer 518 corresponding with the values for selected pixels in a line can also be applied to arithmetic or logic circuit 514 as shown in FIG. 3. Circuit 514 may perform an arithmetic or a logical operation on those values to produce the binary output for circuit 510 that controls the processing direction or may combine those values with the input pixel values obtained from input buffer 502, or combinations of the input values.

Circuit 514 may be designed to perform any one of a variety of different arithmetic or logical operations on the data in one or both buffers 502 and 518 to determine the processing direction. In accordance with one illustrative embodiment, the apparatus in FIG. 5 may exclusive-OR the image data values for the fifth and tenth pixels in the image line, exclusive-OR the last three values in the error buffer 518, sum the results of the two exclusive-OR operations and apply the sum to a modulo-2 circuit to generate the buffer control output of circuit 514. In accordance with another embodiment, circuit 514 may add the first three image pixel values together and add the resulting sum to the sum of the third and fourth error values. This latter sum is then passed through a modulo-2 circuit to generate the output. The exact arithmetic and logical operations performed by circuit 514 and the pixel positions selected from buffers 502 and 518 can be varied without departing from the spirit and scope of the invention. However, we have found that summing both the image and quantization data for a plurality of pixels in each line to produce the processing direction signal for the printer results in a printer output in which readily-discernible worm-type artifacts are minimized.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description as shown in the accompanying drawing shall be interpreted as illustrative and not in the limiting sense. It is also to be understood that the following claims are intended to cover all of the generic and specific features of the invention described herein.

What is claimed is:

1. A method of converting a continuous-tone image, represented as an array of electronically encoded pixels each specifying a gray-scale value, into a binary raster suitable for electronic printing, the method comprising the steps of:

A. identifying a series of pixels corresponding to a linear segment of the image;

B. processing the identified pixels, in a sequence corresponding to movement along the segment in a selected one of a first direction and a second direction, to convert the pixels into binary raster values; and C. repeating the identification and processing steps until the image has been fully processed, wherein the selected one direction of a processing sequence is based on information from at least one previous processed pixel.

2. The method of claim 1 wherein the direction-determining information comprises the gray-scale value of at least one previously processed pixel.

3. The method of claim 2 wherein the gray-scale values of a plurality of previously processed pixels are combined, and the predetermined direction is obtained from the combination.

4. The method of claim 3 wherein the gray-scale values are combined arithmetically and then taken modulo-2 to produce a binary value corresponding to the predetermined direction.

5. The method of claim 3 wherein the gray-scale values are combined logically and then taken modulo-2 to produce a binary value corresponding to the predetermined direction.

6. The method of claim 3 wherein the previously processed pixels are selected from the immediately previous series of pixels.

7. A method of converting a continuous-tone image, represented as an array of electrically encoded pixels each specifying a gray-scale value, into a binary raster suitable for electronic printing, the method comprising the steps of:

A. identifying a series of pixels corresponding to a linear segment of the image;

B. processing the identified pixels, in a sequence corresponding to movement along the segment in a predetermined direction, to convert the pixels into binary raster values; and C. repeating the identification and processing steps until the image has been fully processed, wherein the predetermined direction of a processing sequence is based on information from at least one previous processing sequence, wherein the direction-determining information comprises the gray-scale value of at least one previously processed pixel, wherein the gray-scale values of a plurality of previously processed pixels are combined, and the predetermined direction is obtained from the combination, wherein the previously processed pixels are selected from the immediately previous series of pixels, and wherein, for each processing sequence, the selected pixels occupy identical sequence locations in the immediately previous series of pixels.

8. A method of converting a continuous-tone image, represented as an array of electrically encoded pixels each specifying a gray-scale value, into a binary raster suitable for electronic printing, the method comprising the steps of:

A. identifying a series of pixels corresponding to a linear segment of the image;

B. processing the identified pixels, in a sequence corresponding to movement along the segment in a predetermined direction, to convert the pixels into binary raster values; and C. repeating the identification and processing steps until the image has been fully processed, wherein the predetermined direction of a processing sequence is based on information from at least one previous processing sequence, wherein step B comprises the steps of:

B1. iteratively comparing the values of pixels with a threshold value;

B2. selecting binary raster values based on the comparisons; and

B3. electronically storing error values defining the differences between pixel values and the threshold values, wherein the direction-determining information comprises error values associated with at least one previously processed pixel.

9. The method of claim 8 wherein the direction-determining information comprises the error value of at least one previously processed pixel.

10. The method of claim 9 wherein the error values of a plurality of previously processed pixels are combined, and the predetermined direction is obtained from the combination.

11. The method of claim 10 wherein the error values are combined arithmetically and then taken modulo-2 to produce a binary value corresponding to the predetermined direction.

12. The method of claim 10 wherein the error values are combined logically and then taken modulo-2 to produce a binary value corresponding to the predetermined direction.

13. The method of claim 10 wherein the error values are associated with pixels selected from the immediately previous series of pixels.

14. The method of claim 13 wherein, for each processing sequence, the error values corresponding to pixels that occupy identical sequence locations in the immediately previous series of pixels.

15. An image-processing system for converting a continuous-tone image into a binary raster suitable for printing, the apparatus comprising:

means for storing an array of electronically encoded pixels each representing a gray-scale value; and halftoning means for iteratively processing series of pixels each corresponding to a linear segment of the image, in a sequence representative of movement along the segment in a selected one of a first direction and a second direction, so as to produce binary raster values therefrom, wherein the selected one direction of the processing sequence is based on information from at least one previous processed pixel.

16. The system of claim 15 wherein the direction-determining information comprises the gray-scale value of at least one previously processed pixel.

17. The system of claim 16 further comprising an arithmetic and logic circuit for combining the gray-scale values of a plurality of previously processed pixels, and wherein the predetermined direction is obtained from the combination.

18. The system of claim 17 wherein the arithmetic and logic circuit adds the gray-scale values and thereafter performs a modulo-2 operation on the sum to produce a binary value corresponding to the predetermined direction.

19. The system of claim 17 wherein the arithmetic and logic circuit combines the gray-scale values logically and thereafter performs a modulo-2 operation on the logical combination to produce a binary value corresponding to the predetermined direction.

20. The system of claim 15 further comprising an image line buffer for storing the gray-scale values of the immediately previous series of pixels, and wherein the previously processed pixels are selected from the buffer.

21. An image-processing system for converting a continuous-tone image into a binary raster suitable for printing, the apparatus comprising:

means for storing an array of electronically encoded pixels each representing a gray-scale value;

halftoning means for iteratively processing series of pixels each corresponding to a linear segment of the image, in a sequence representative of movement along the segment in a predetermined direction, so as to produce binary raster values therefrom, wherein the predetermined direction of the processing sequence is based on information from at least one previous processing sequence; and an image line buffer for storing the gray-scale values of the immediately previous series of pixels, and wherein the previously processed pixels are selected from the buffer, wherein, for each processing sequence, the selected pixels occupy identical memory locations in the buffer.

22. An image-processing system for converting a continuous-tone image into a binary raster suitable for printing, the apparatus comprising:

means for storing an array of electronically encoded pixels each representing a gray-scale value; and     halftoning means for iteratively processing series of pixels each corresponding to a linear segment of the image, in a sequence representative of movement along the segment in a predetermined direction, so as to produce binary raster values therefrom, wherein the predetermined direction of the processing sequence is based on information from at least one previous processing sequence;

wherein the halftoning means comprises:

a threshold circuit for iteratively comparing the values of pixels with a threshold value and generating, from the comparison, a binary raster value;

an output buffer for storing the binary values; and         an error buffer for storing error values defining the differences between pixel values and the threshold values, wherein the direction-determining information comprises error values associated with at least one previously processed pixel.

23. The system of claim 22 wherein the direction-determining information comprises the error value of at least one previously processed pixel.

24. The system of claim 23 further comprising an arithmetic and logic circuit for combining the error values of a plurality of previously processed pixels, and wherein the predetermined direction is obtained from the combination.

25. The system of claim 24 wherein the arithmetic and logic circuit adds the error values and thereafter performs a modulo-2 operation on the sum to produce a binary value corresponding to the predetermined direction.

26. The system of claim 24 wherein the arithmetic and logic circuit combines the error values logically and thereafter performs a modulo-2 operation to produce a binary value corresponding to the predetermined direction.

27. The system of claim 22 wherein the error buffer stores the error values of the immediately previous series of pixels, and wherein the error values are selected from the error buffer.

28. The system of claim 27 wherein, for each processing sequence, the error values occupy identical memory locations in the buffer.

29. A printer for printing a continuous-tone image as patterns of monochrome dots on a print medium, the printer comprising:

digitizing means responsive to the continuous-tone image for generating a stream of electronically encoded pixel values, each representing a gray-scale value of a portion of the continuous-tone image;

means responsive to the stream of electronically encoded pixel values for storing the electronically encoded pixel values in a plurality of linear segments, each linear segment having a start and an end and comprising pixel values that represent contiguous portions of the continuous-tone image; and     halftoning means controllable to process each pixel value in each of the plurality of linear segments in a selected one of a first direction and a second direction to generate output results;

direction means responsive to the stored electronically coded pixel values for controlling the halftoning means in the selected one of the first direction and the second direction, the selected direction being based on information form at least one previous processed pixel; and     a print mechanism responsive to the output results for generating the patterns of monochrome dots on the print medium.

30. The printer of claim 29 wherein the direction means comprises means responsive to the output results for controlling the halftoning means to select one of the start to end and end to start sequences.

31. The printer of claim 29 wherein the direction means comprises processing means responsive to the stored electronically coded pixel values for arithmetically combining selected ones of the stored electronically coded pixel values in order to generate a binary direction value and means responsive to the binary direction value for controlling the halftoning means to select one of the start to end and end to start sequences.

32. The printer of claim 29 wherein the direction means comprises processing means responsive to the stored electronically coded pixel values for logically combining selected ones of the stored electronically coded pixel values in order to generate a binary direction value and means responsive to the binary direction value for controlling the halftoning means to select one of the start to end and end to start sequences.

33. The printer of claim 29 wherein the direction means comprises processing means responsive to the stored electronically coded pixel values for arithmetically combining selected ones of the stored electronically coded pixel values and selected output results in order to generate a binary direction value and means responsive to the binary direction value for controlling the halftoning means to select one of the start to end and end to start sequences.

34. The printer of claim 29 wherein the direction means comprises processing means responsive to the stored electronically coded pixel values for logically combining selected ones of the stored electronically coded pixel values and selected output results in order to generate a binary direction value and means responsive to the binary direction value for controlling the halftoning means to select one of the start to end and end to start sequences.

35. A computer system comprising:

a memory for storing data and programs;

a central processing unit responsive to programs stored in the memory for controlling and coordinating the operation of the computer system;

digitizing means responsive to the continuous-tone image for generating a stream of electronically encoded pixel values, each representing a gray-scale value of a portion of the continuous-tone image;

means responsive to the stream of electronically encoded pixel values for storing the electronically encoded pixel values in a plurality of linear segments, each linear segment having a start and an end and comprising pixel values that represent contiguous portions of the continuous-tone image;

halftoning means controllable to process each pixel value in each of the plurality of linear segments in a in a selected one of a first direction and a second direction to generate output results;

direction means responsive to the stored electronically coded pixel values for controlling the halftoning means in the selected one of the first direction and the second direction, the selected direction being based on information from at least one previous halftoned pixel; and     a printer responsive to the output results for printing patterns of monochrome dots on a print medium to generate a halftoned image.

36. The computer system of claim 35 wherein the direction means comprises means responsive to the output results for controlling the halftoning means to select one of the start to end and end to start sequences.

37. The computer system of claim 35 wherein the direction means comprises processing means responsive to the stored electronically coded pixel values for arithmetically combining selected ones of the stored electronically coded pixel values in order to generate a binary direction value and means responsive to the binary direction value for controlling the halftoning means to select one of the start to end and end to start sequences.

38. The computer system of claim 35 wherein the direction means comprises processing means responsive to the stored electronically coded pixel values for logically combining selected ones of the stored electronically coded pixel values in order to generate a binary direction value and means responsive to the binary direction value for controlling the halftoning means to select one of the start to end and end to start sequences.

39. The computer system of claim 35 wherein the direction means comprises processing means responsive to the stored electronically coded pixel values for arithmetically combining selected ones of the stored electronically coded pixel values and selected output results in the binary direction value for controlling the halftoning means to select one of the start to end and end to start sequences.

40. The computer system of claim 35 wherein the direction means comprises processing means responsive to the stored electronically coded pixel values for logically combining selected ones of the stored electronically coded pixel values and selected output results in order to generate a binary direction value and means responsive to the binary direction value for controlling the halftoning means to select one of the start to end and end to start sequences.

* * * * *